(12) United States Patent
Nanjo

(10) Patent No.: US 9,054,833 B2
(45) Date of Patent: Jun. 9, 2015

(54) OPTICAL TRANSMISSION SYSTEM, RECEIVING-END DEVICE, AND OPTICAL TRANSMISSION METHOD

(71) Applicant: NEC Corporation, Minato-ku, Tokyo (JP)

(72) Inventor: Tatsunori Nanjo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 13/931,088

(22) Filed: Jun. 28, 2013

(65) Prior Publication Data

US 2014/0023371 A1 Jan. 23, 2014

(30) Foreign Application Priority Data

Jul. 23, 2012 (JP) ................................. 2012-162560

(51) Int. Cl.
*H04B 10/00* (2013.01)
*H04J 14/02* (2006.01)

(52) U.S. Cl.
CPC ......... *H04J 14/0293* (2013.01); *H04J 14/0294* (2013.01); *H04J 14/0295* (2013.01)

(58) Field of Classification Search
CPC .............. H04J 14/0293; H04J 14/0294; H04J 14/0295; H04J 14/0204; H04J 14/0205; H04J 14/0206; H04J 14/0212; H04J 14/0287; H04J 14/0291; H04J 14/0297; H04J 14/029; H04B 10/032
USPC ........ 398/1, 2, 5, 6, 12, 19, 79, 7, 66, 68, 140
See application file for complete search history.

(56) References Cited

U.S. PATENT DOCUMENTS

| | | | | |
|---|---|---|---|---|
| 7,113,702 | B2 * | 9/2006 | Yamada et al. | 398/79 |
| 7,171,118 | B2 * | 1/2007 | Kim et al. | 398/50 |
| 7,233,738 | B2 * | 6/2007 | Kerfoot, III | 398/10 |
| 7,565,084 | B1 * | 7/2009 | Wach | 398/201 |
| 7,877,008 | B2 * | 1/2011 | Li et al. | 398/5 |
| 7,965,949 | B1 * | 6/2011 | Wach | 398/200 |
| 2001/0046074 | A1 * | 11/2001 | Kakizaki et al. | 359/110 |
| 2003/0016415 | A1 * | 1/2003 | Jun et al. | 359/133 |
| 2006/0133804 | A1 * | 6/2006 | Boduch et al. | 398/5 |
| 2007/0248361 | A1 * | 10/2007 | Nakamura et al. | 398/152 |
| 2008/0199178 | A1 * | 8/2008 | Hovakimyan et al. | 398/5 |
| 2011/0158648 | A1 * | 6/2011 | Kubo et al. | 398/48 |
| 2014/0268344 | A1 * | 9/2014 | Arakawa | 359/580 |

FOREIGN PATENT DOCUMENTS

| | | |
|---|---|---|
| JP | 2010-056899 A | 3/2010 |
| WO | 2010/044154 A1 | 4/2010 |

* cited by examiner

*Primary Examiner* — Daniel Washburn
*Assistant Examiner* — Hibret Woldekidan
(74) *Attorney, Agent, or Firm* — Sughrue Mion, PLLC

(57) ABSTRACT

An optical transmission system includes an optical transmitting device (8) and an optical receiving device (9). The optical transmitting device (8) includes an operating channel transmitting unit (81) that transmits a first optical signal to an operating channel, and a redundant channel transmitting unit (82) that transmits a second optical signal having the same information as the first optical signal to a redundant channel. The optical receiving device (9) includes a local selection function unit (91) that has a function of selecting a wavelength of the first optical signal or the second optical signal transmitted from the optical transmitting device (8), a channel setting control unit (92) that sets a wavelength to be selected by the local selection function unit (91), and a receiving unit (93) that receives the first optical signal or the second optical signal having the wavelength selected by the local selection function unit (91).

8 Claims, 6 Drawing Sheets

OPTICAL TRANSMISSION SYSTEM, RECEIVING-END DEVICE, AND OPTICAL TRANSMISSION METHOD

INCORPORATION BY REFERENCE

This application is based upon and claims the benefit of priority from Japanese patent application No. 2012-162560, filed on Jul. 23, 2012, the disclosure of which is incorporated herein in its entirety by reference.

BACKGROUND OF THE INVENTION

1. Technical Field

The present invention relates to an optical transmission system, a receiving-end device, and an optical transmission method and, particularly, to a technique to transmit and receive optical signals having the same information through each of an operational channel and a redundant channel.

2. Background Art

One example of a redundant configuration of the wavelength division multiplexing (WDM) transmission system is a 1:1 configuration where the redundant configuration is composed of an operating transponder for mainly making the wavelength division multiplexing transmission system operate and a redundant transponder for making redundancy separately as a spare. Another example of a redundant configuration of the wavelength division multiplexing transmission system is a 1+1 configuration where the redundant configuration is composed of an operating path and a redundant path and, upon occurrence of an abnormal event in the operating path, capable of switching from the operating path to the redundant path by an optical switch.

However, in the above configurations, it is necessary to prepare the redundant transponder in addition to the operating transponder or prepare the optical switch for switching from the operating path to the redundant path. There is thus a problem that the cost increases to build the redundant configuration. There is also a problem that complicated processing such as switching from the operating transponder to the redundant transponder and switching from the operating path to the redundant path is required.

The redundant configuration systems related to wavelength division multiplexing transmission are disclosed also in WO2010/044154 and Japanese Unexamined Patent Publication No. 2010-056899. However, in the both systems disclosed in those patent literatures, components such as a redundant transponder, an optical switch or an optical coupler are required, and there is still a problem that the cost increases. Further, there is also a problem that complicated processing for switching is required as described above. Thus, those patent literatures do not disclose a technique to solve the above problems, differently from the below-described exemplary embodiment of the invention that solves the above problems through effective utilization of a local selection function.

As described above, in the wavelength division multiplexing transmission system, there are problems that the system is complex and the cost increases when constructing the redundant configuration.

SUMMARY

To solve the above problems, an exemplary object of the invention is to provide an optical transmission system, a receiving-end device, and an optical transmission method that can simplify the system and reduce the cost even when the redundant configuration is constructed in the system to transmit optical signals.

In a first exemplary aspect of the invention, an optical transmission system includes an optical transmitting device and an optical receiving device, wherein the optical transmitting device includes an operating channel transmitting unit that transmits a first optical signal to an operating channel, and a redundant channel transmitting unit that transmits a second optical signal having the same information as and a different wavelength from the first optical signal to a redundant channel, and the optical receiving device includes a local selection function unit that has a function of selecting a wavelength of the first optical signal or the second optical signal by interference of local light having the same wavelength as the first optical signal or the second optical signal transmitted from the optical transmitting device, a channel setting control unit that sets a wavelength to be selected by the local selection function unit, and a receiving unit that receives the first optical signal or the second optical signal having the wavelength selected by the local selection function unit.

In a second exemplary aspect of the invention, a receiving-end device includes a local selection function unit that has a function of selecting a wavelength of a first optical signal transmitted from an optical transmitting device through an operating channel or a second optical signal transmitted from the optical transmitting device through a redundant channel, the second optical signal having the same information as and a different wavelength from the first optical signal, by interference of local light having the same wavelength as the first optical signal or the second optical signal, a channel setting control unit that sets a wavelength to be selected by the local selection function unit, and a receiving unit that receives the first optical signal or the second optical signal having the wavelength selected by the local selection function unit.

In a third exemplary aspect of the invention, an optical transmission method includes transmitting a first optical signal to an operating channel and transmitting a second optical signal having the same information as and a different wavelength from the first optical signal to a redundant channel, setting a wavelength of an optical signal to be selected between the first optical signal and the second optical signal, selecting a wavelength of the first optical signal or the second optical signal transmitted by interference of local light having the set wavelength, and receiving the first optical signal or the second optical signal having the selected wavelength.

BRIEF DESCRIPTION OF THE DRAWINGS

The above and other objects, features and advantages of the present invention will become more fully understood from the detailed description given hereinbelow and the accompanying drawings which are given by way of illustration only, and thus are not to be considered as limiting the present invention.

EXEMPLARY EMBODIMENT

[Exemplary embodiment]

Figure 1:
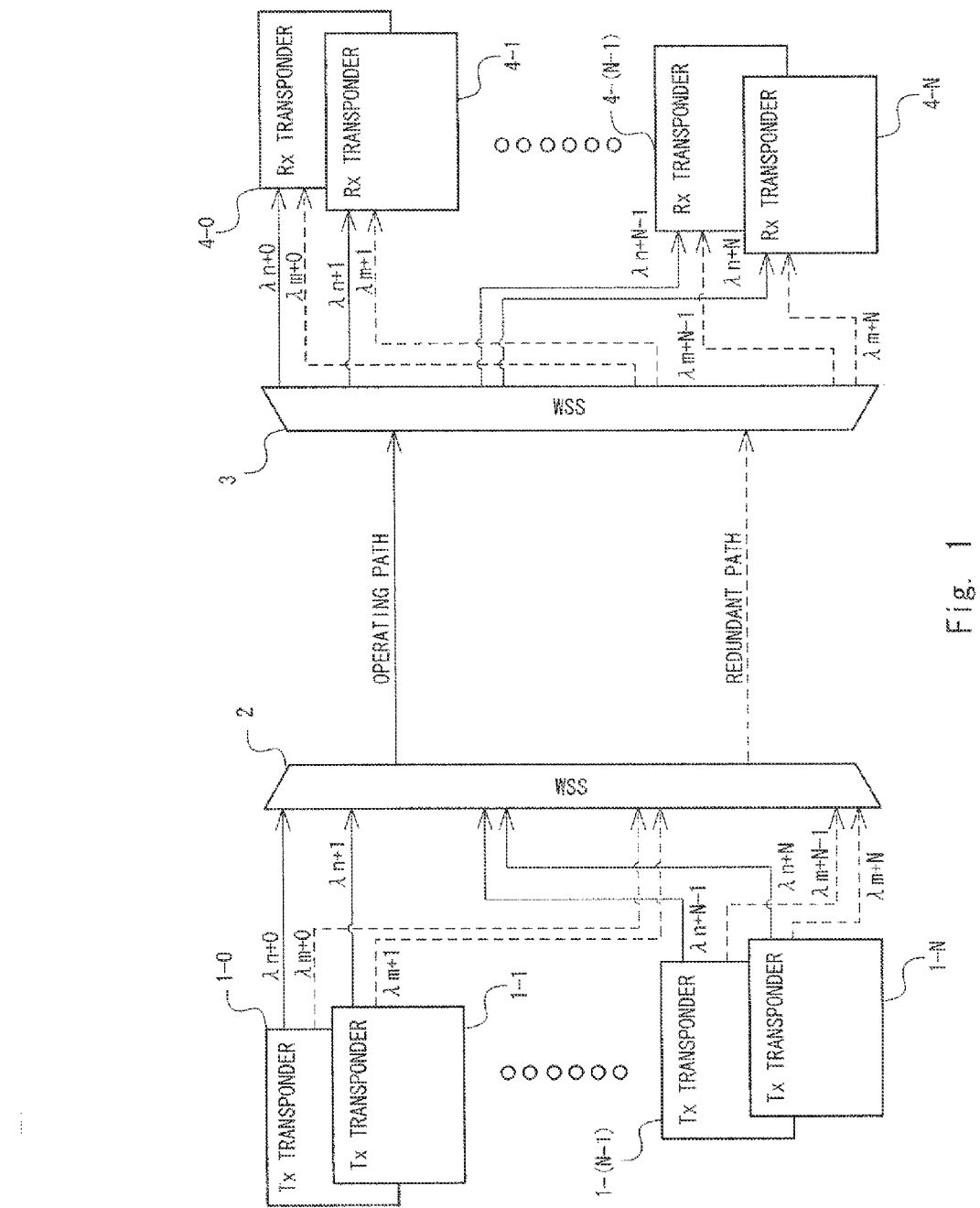
FIG. 1 is a block diagram of a wavelength division multiplexing transmission system according to an exemplary embodiment of the invention.

A configuration of a wavelength division multiplexing transmission system according to an exemplary embodiment of the invention is described hereinafter with reference to FIG. 1. FIG. 1 is a block diagram of a wavelength division multiplexing transmission system according to an exemplary embodiment of the invention.

The wavelength division multiplexing transmission system includes Tx transponders 1-0 to 1-N, wavelength selective switches (WSS) 2 and 3, and Rx transponders 4-0 to 4-N. N is any positive integer.

Note that the Tx transponders 1-0 to 1-N are hereinafter also referred to collectively as "Tx transponders 1", and the Rx transponders 4-0 to 4-N are also referred to collectively as "Rx transponders 4". Further, optical signals (wavelengths $\lambda n+0$ to $\lambda n+N$) that are respectively transmitted from the Tx transponders 1-0 to 1-N through an operating path are referred to collectively as "optical signals for operating path", and optical signals (wavelengths $\lambda m+0$ to $\lambda m+N$) that are respectively transmitted from the Tx transponders 1-0 to 1-N through a redundant path are referred to collectively as "optical signals for redundant path".

The Tx transponders 1 transmit the optical signals for operating path and the optical signals for redundant path to the Rx transponders 4 placed opposite thereto. Specifically, the optical signal for operating path (wavelength $\lambda n+1$) and the optical signal for redundant path (wavelength $\lambda m+1$) that are transmitted from the Tx transponder 1-k is received by the Rx transponder 4-k that is placed opposite to the Tx transponder 1-k. Note that k is any of 0 to N.

The optical signal for operating path and the optical signal for redundant path that are transmitted from the same Tx transponder are optical signals having the same information and having different wavelengths. Specifically, the path to transmit optical signals from the Tx transponders 1 to the Rx transponders 4 is made redundant, and even when optical signals cannot be transmitted through the operating path, the optical signals can be transmitted through the redundant path. When the Tx transponders 1 transmit the optical signals for operating path and the optical signals for redundant path to the Rx transponders 4, the Tx transponders 1 output the respective optical signals to the WSS 2.

The WSS 2 selects a wavelength with an arbitrary wavelength number (CH number) among a plurality of optical signals output from the Tx transponders 1-0 to 1-N, multiplex the wavelengths of the optical signals with the selected wavelength and outputs them to an arbitrary output port (the operating path or the redundant path). Specifically, the WSS 2 selects, among the optical signals for operating path (wavelengths $\lambda n+0$ to $\lambda n+N$) and the optical signals for redundant path (wavelengths $\lambda m+0$ to $\lambda m+N$) output from the Tx transponders 1-0 to 1-N, the optical signals for operating path (wavelengths $\lambda n+0$ to $\lambda n+N$) and outputs them to the operating path, and selects the optical signals for redundant path (wavelengths $\lambda m+0$ to $\lambda m+N$) and outputs them to the redundant path. The optical signals for operating path (wavelengths $\lambda n+0$ to $\lambda n+N$) are thereby wavelength-multiplexed and transmitted to the WSS 3 through the operating path, and the optical signals for redundant path (wavelengths $\lambda m+0$ to $\lambda m+N$) are thereby wavelength-multiplexed and transmitted to the WSS 3 through the redundant path.

The WSS 3 receives the optical signals for operating path (wavelengths $\lambda n+0$ to $\lambda n+N$) transmitted from the WSS 2 through the operating path, and the optical signals for redundant path (wavelengths $\lambda m+0$ to $\lambda m+N$) transmitted from the WSS 2 through the redundant path. The WSS 3 divides the wavelengths of the plurality of received optical signals and outputs the optical signals with an arbitrary wavelength number (CH number) to an arbitrary output port (each of the Rx transponders 4-0 to 4-N). Specifically, the WSS 3 outputs the optical signal for operating path (wavelength $\lambda n+k$) and the optical signal for redundant path (wavelength $\lambda m+k$) that are transmitted from the Tx transponder 1-k to the Rx transponder 4-k that is placed opposite to the Tx transponder 1-k. The optical signal for operating path (wavelength $\lambda n+k$) and the optical signal for redundant path (wavelength $\lambda m+k$) that are transmitted from the Tx transponder 1-k are thereby received by the Rx transponder 4-k that is placed opposite to the Tx transponder 1-k.

The Rx transponders 4 are transponders having a local selection function that is implemented by digital coherent technology. The Rx transponders 4 select and receive the optical signals having a certain wavelength by interference of local light having the same wavelength as one of the optical signal for operating path and the optical signal for redundant path output from the WSS 3 using the local selection function.

Figure 2:
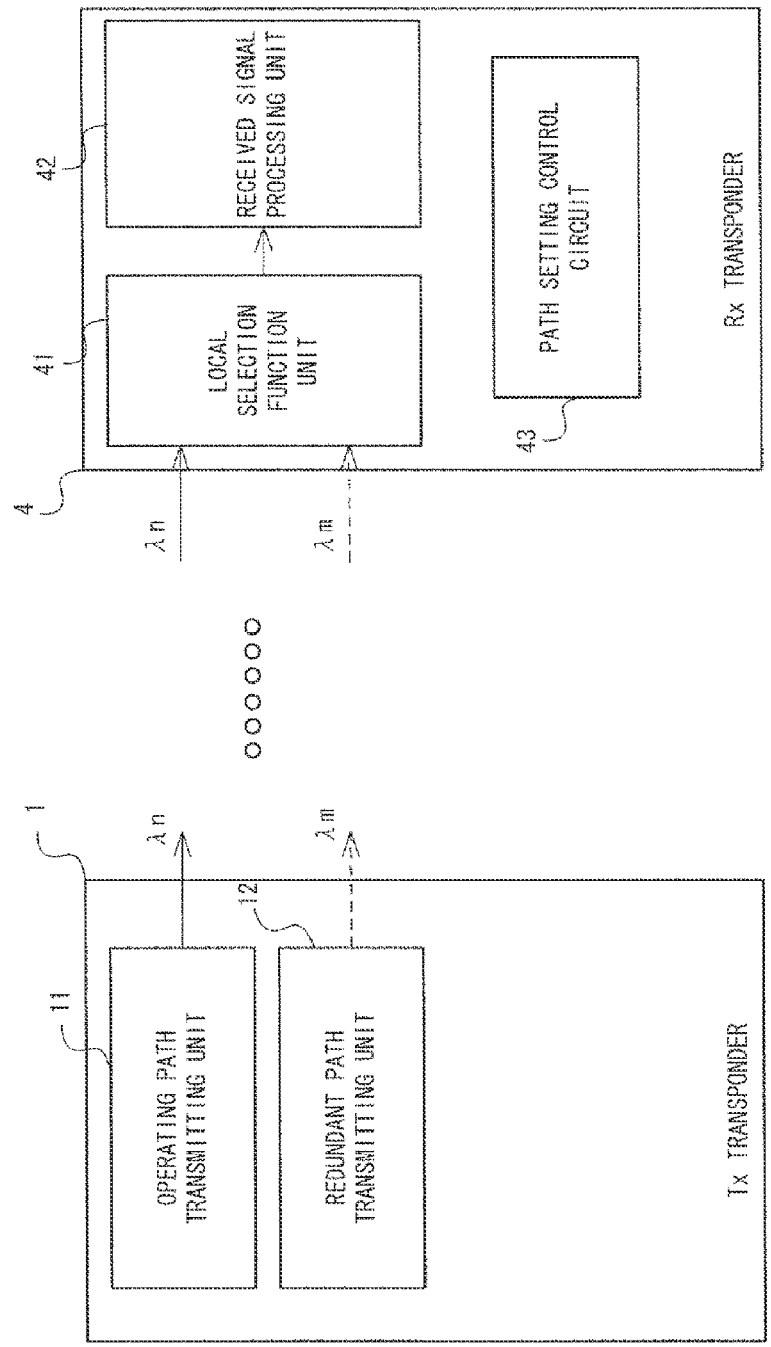
FIG. 2 is a block diagram of transponders according to the exemplary embodiment of the invention.

The configurations of the transponders 1 and 4 according to the exemplary embodiment of the invention are described hereinafter with reference to FIG. 2. FIG. 2 is a block diagram of the transponders 1 and 4 according to the exemplary embodiment of the invention.

The Tx transponder 1 includes an operating path transmitting unit 11 and a redundant path transmitting unit 12.

The operating path transmitting unit 11 generates the optical signal for operating path to be transmitted to the Rx transponder 4 and outputs it to the WSS 2.

The redundant path transmitting unit 12 generates the optical signal for redundant path to be transmitted to the Rx transponder 4 and outputs it to the WSS 2. The optical signal for redundant path that is generated by the redundant path transmitting unit 12 has the same information as the optical signal for operating path that is generated by the operating path transmitting unit 11 but has a different wavelength from it.

The Rx transponder 4 includes a local selection function unit 41, a received signal processing unit 42, and a path setting control circuit 43.

The local selection function unit 41 selects a desired wavelength (optical signal) from a plurality of wavelengths (optical signals) by the local selection function in digital coherent technology. The local selection function unit 41 selects an optical signal to be received by making local light having the same wavelength as the optical signal to be received (the optical signal for operating path or the optical signal for redundant path) interfere with the optical signals output from the WSS 3 (the optical signal for operating path and the optical signal for redundant path).

The received signal processing unit 42 receives the optical signal selected by the local selection function unit 41. The received signal processing unit 42 receives the optical signal in which the local light having the same wavelength as the optical signal to be received (the optical signal for operating path or the optical signal for redundant path) interferes with the optical signals output from the WSS 3 as the optical signal to be received.

The path setting control circuit 43 controls the local selection function unit 41 so as to select either one of the optical signal for operating path and the optical signal for redundant path as the optical signal to be received. Specifically, when an abnormal condition (such as signal disconnection due to optical fiber break) occurs in the operating path, the path setting control circuit 43 changes the wavelength to be selected by the local selection function unit 41 (the wavelength of local light) to the wavelength of the optical signal for redundant path so that the optical signal for redundant path that is transmitted through the redundant path, instead of the operating path, is selected. Note that the abnormal condition in the operating path may be detected in any general method. For example, it can be determined that an abnormal condition is occurring when the optical signal for operating path has not been detected for a certain period of time. The path setting control circuit 43 may be implemented by FPGA (Field Programmable Gate Array).

Figure 3:
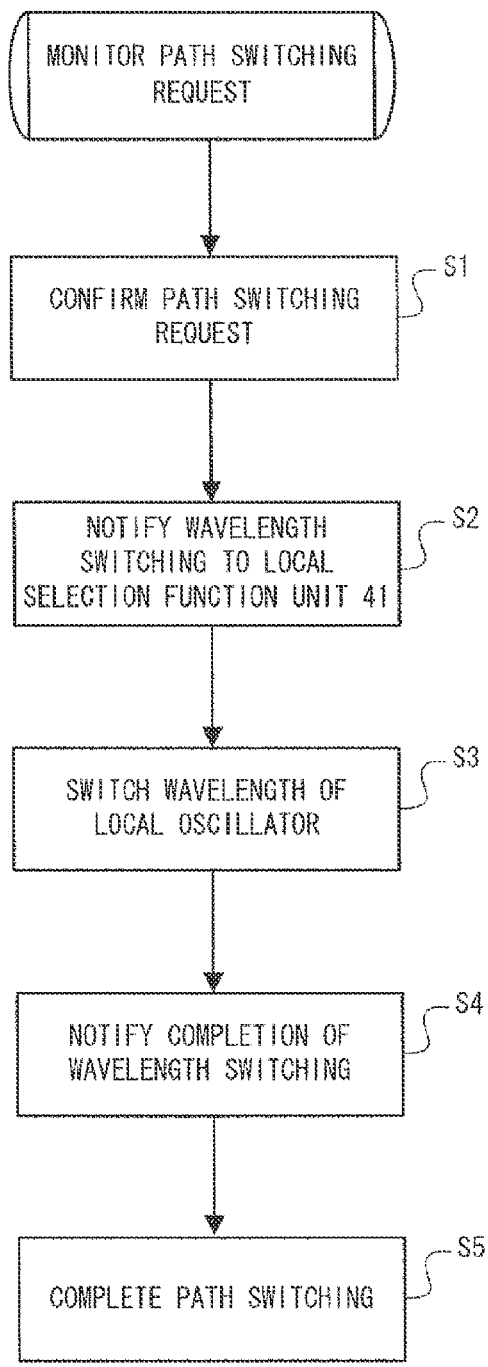
FIG. 3 is a flowchart showing an operation of the wavelength division multiplexing transmission system according to the exemplary embodiment of the invention.

The operation of the wavelength division multiplexing transmission system according to the exemplary embodiment of the invention is described hereinafter with reference to FIG. 3. FIG. 3 is a flowchart showing the operation of the wavelength division multiplexing transmission system according to the exemplary embodiment of the invention.

FIG. 3 shows the operation of the Rx transponder 4 in the case where an abnormal condition occurs in the operating path in the wavelength division multiplexing transmission system shown in FIG. 1. It is assumed that the wavelengths $\lambda n+0$ to $\lambda n+N$ of the optical signals for operating path and the wavelengths $\lambda m+0$ to $\lambda m+N$ of the optical signals for redundant path are predetermined by a wavelength table. For example, a receiving-end device including the WSS 3 and the Rx transponders 4-0 to 4-N includes a storage device in which the wavelength table is prestored. The wavelength table is information indicating the wavelengths $\lambda n+0$ to $\lambda n+N$ of the optical signals for operating path and the wavelengths $\lambda m+0$ to $\lambda m+N$ of the optical signals for redundant path. Note that, in the wavelength table, the wavelengths $\lambda n+0$ to $\lambda n+N$ of the optical signals for operating path and the wavelengths $\lambda m+0$ to $\lambda m+N$ of the optical signals for redundant path may be defined by dividing them into the first half and the second half of all wavelength numbers or defined by dividing them into odd numbers and even numbers.

The Rx transponder 4 monitors the occurrence of an abnormal condition such as signal disconnection in the operating path. When the Rx transponder 4 detects an abnormal condition in the operating path, it generates a path switching request signal that requests switching of paths inside and outputs the signal to the path setting control circuit 43 (Step S1). The path setting control circuit 43 monitors the path switching request signal and, when detecting the output of the path switching request signal inside the Rx transponder 4, outputs a switching instruction signal that instructs switching of the wavelength to be selected by the local selection function unit 41 to the local selection function unit 41 (Step S2). Specifically, the switching instruction signal is a signal that instructs switching of the wavelength to be selected in the local selection function unit 41 from the wavelength of the optical signal for operating path to the wavelength of the optical signal for redundant path.

In response to the output of the switching instruction signal from the path setting control circuit 43, the local selection function unit 41 changes the wavelength of a local oscillator inside the local selection function unit 41 from the wavelength of the optical signal for operating path to the wavelength of the optical signal for redundant path (Step S3).

In other words, the local selection function unit 41 changes the wavelength of local light generated by the local oscillator from the wavelength of the optical signal for operating path to the wavelength of the optical signal for redundant path. Specifically, the local selection function unit 41 refers to the wavelength of the optical signal for operating path or the wavelength of the optical signal for redundant path corresponding to its own Rx transponder in the wavelength table and thereby generates the local light having the reference wavelength. The local selection function unit 41 changes the reference wavelength in the wavelength table from the wavelength of the optical signal for operating path to the wavelength of the optical signal for redundant path in accordance with the switching instruction signal and thereby changes the wavelength of local light generated by the local oscillator to the wavelength of the optical signal for redundant path.

After changing the wavelength, the local selection function unit 41 outputs a setting completion notification signal that notifies the completion of wavelength change setting to the path setting control circuit 43 (Step S4). Upon completion of wavelength change setting, switching of paths is completed (Step S5).

According to this process, the received signal processing unit 42 of the Rx transponder 4 can receive the optical signal having the same information as that of the operating path by the redundant path instead of the operating path where an abnormal condition has occurred and thereby continue the operation.

The effects of this exemplary embodiment are described hereinbelow. To clarify the effects of the exemplary embodiment of the invention, the configuration and problems of each of the wavelength division multiplexing transmission system in a 1:1 configuration and the wavelength division multiplexing transmission system in a 1+1 configuration are described first and then the effects of the exemplary embodiment are described after that.

Figure 4:
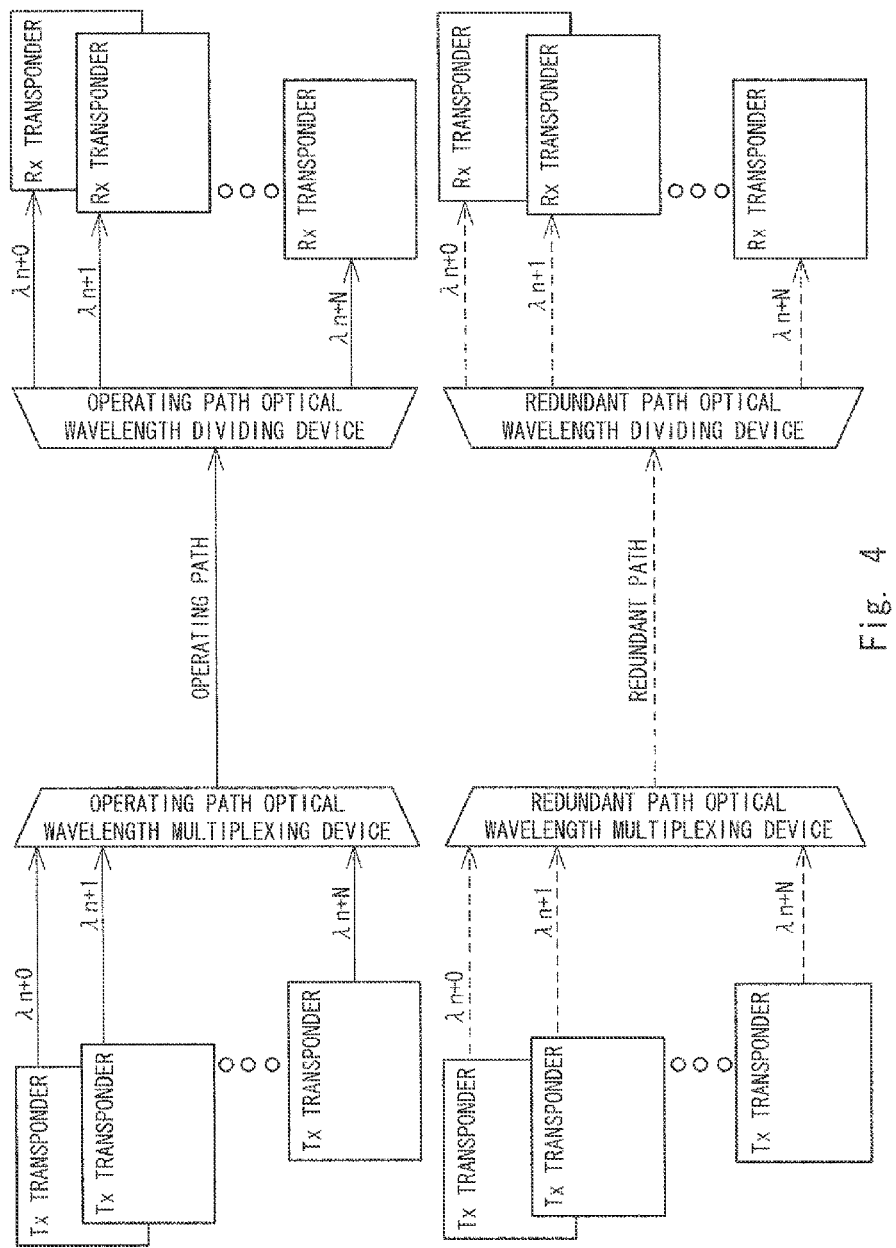
FIG. 4 is a block diagram of the wavelength division multiplexing transmission system in a 1:1 configuration.

First, the wavelength division multiplexing transmission system in a 1:1 configuration is described with reference to FIG. 4. FIG. 4 is a block diagram of the wavelength division multiplexing transmission system in a 1:1 configuration.

In the 1:1 redundant configuration, it is necessary to prepare both of transponders for operating path and transponders for redundant path as shown in FIG. 4, and therefore the cost of twice as much is required compared with the case of not having the redundant configuration. Further, when switching paths from the operating path to the redundant path, it is necessary to perform the switching processing in both of the Tx transponders and the Rx transponders, and therefore complicated system processing is required. For example, the Rx transponder that has detected an abnormal condition in the operating path needs to notify the detection of the abnormal condition in the operating path to the Tx transponder, and the Tx transponder needs to perform processing for path switching.

Figure 5:
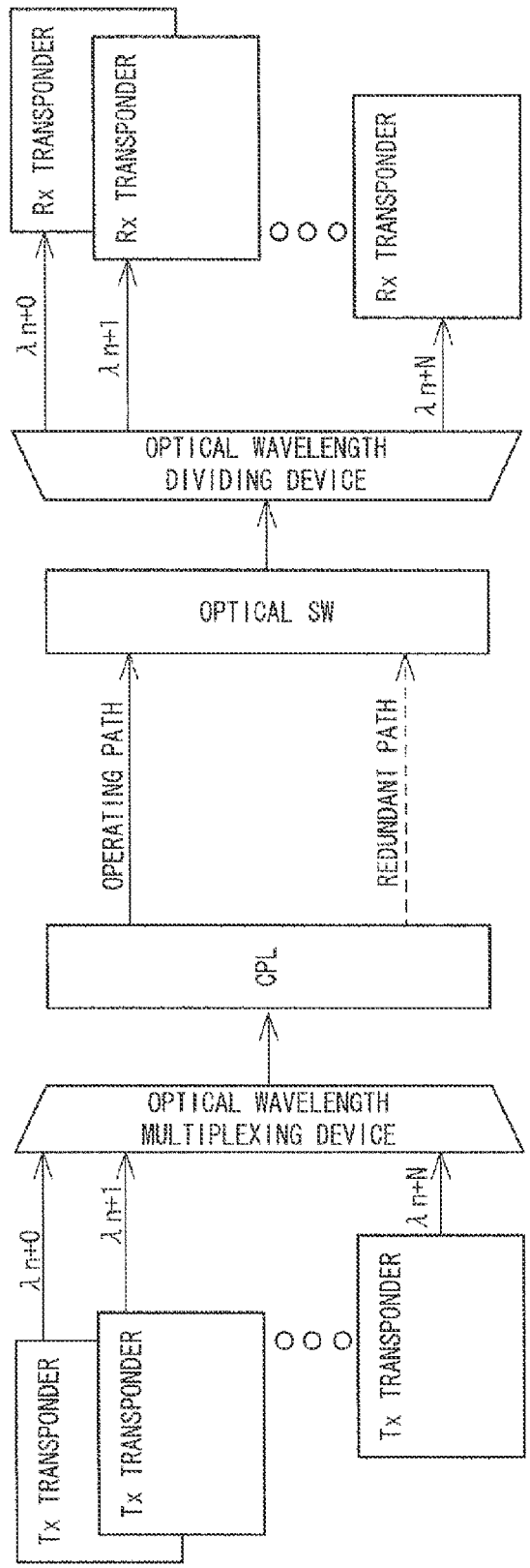
FIG. 5 is a block diagram of the wavelength division multiplexing transmission system in a 1+1 configuration.

Next, the wavelength division multiplexing transmission system in a 1+1 configuration is described with reference to FIG. 5. FIG. 5 is a block diagram of the wavelength division multiplexing transmission system in a 1+1 configuration.

In the 1+1 redundant configuration, it is necessary to prepare an optical coupler (which is shown as "CPL" in FIG. 5) for transmitting optical signals separately through each of the operating path and the redundant path and an optical switch (which is shown as "optical SW" in FIG. 5) for selecting either one of the optical signal for operating path and the optical signal for redundant path. Therefore, the cost increases for the optical coupler and the optical switch compared with the case of not having the redundant configuration.

Further, when switching paths from the operating path to the redundant path, it is necessary to perform the switching processing of the optical switch, and therefore complicated system processing is required. Furthermore, because optical signals are optically divided and transmitted using the optical coupler, the optical power is lower than the case of not having the redundant configuration, which makes long-distance transmission difficult.

In contrast to the above configurations, in this exemplary embodiment, the above-described problems are solved by using the local selection function in digital coherent technology for switching in the redundant configuration. In this exemplary embodiment, both of the optical signal for operating path and the optical signal for redundant path that have the same information and different wavelengths are generated at the transmitting end and the respective optical signals are transmitted through different transmission channels, i.e. the operating path and the redundant path, and then either one of the optical signal for operating path and the optical signal for redundant path is selected and received by the local selection function unit at the receiving end.

This configuration has the following effects.

Because switching of paths can be done only in the Rx transponder at the receiving end, the need for complicated processing such as notifying detection of an abnormal condition in the operating path (path switching instruction) to the transmitting end is eliminated. Further, because switching of paths can be made only in the Rx transponder at the receiving end, there is no need to prepare the redundant transponders, the optical coupler, the optical switch and the like and the cost can be reduced. Accordingly, even when a redundant configuration is constructed in a system to transmit optical signals, it is possible to simplify the system and reduce the cost.

Further, according to this exemplary embodiment, the wavelength of the optical signal for operating path that is transmitted through the operating path and the wavelength of the optical signal for redundant path that is transmitted through the redundant path are managed using the wavelength table. It is thereby possible to avoid duplicate definition of the wavelengths of the optical signals.

Figure 6:
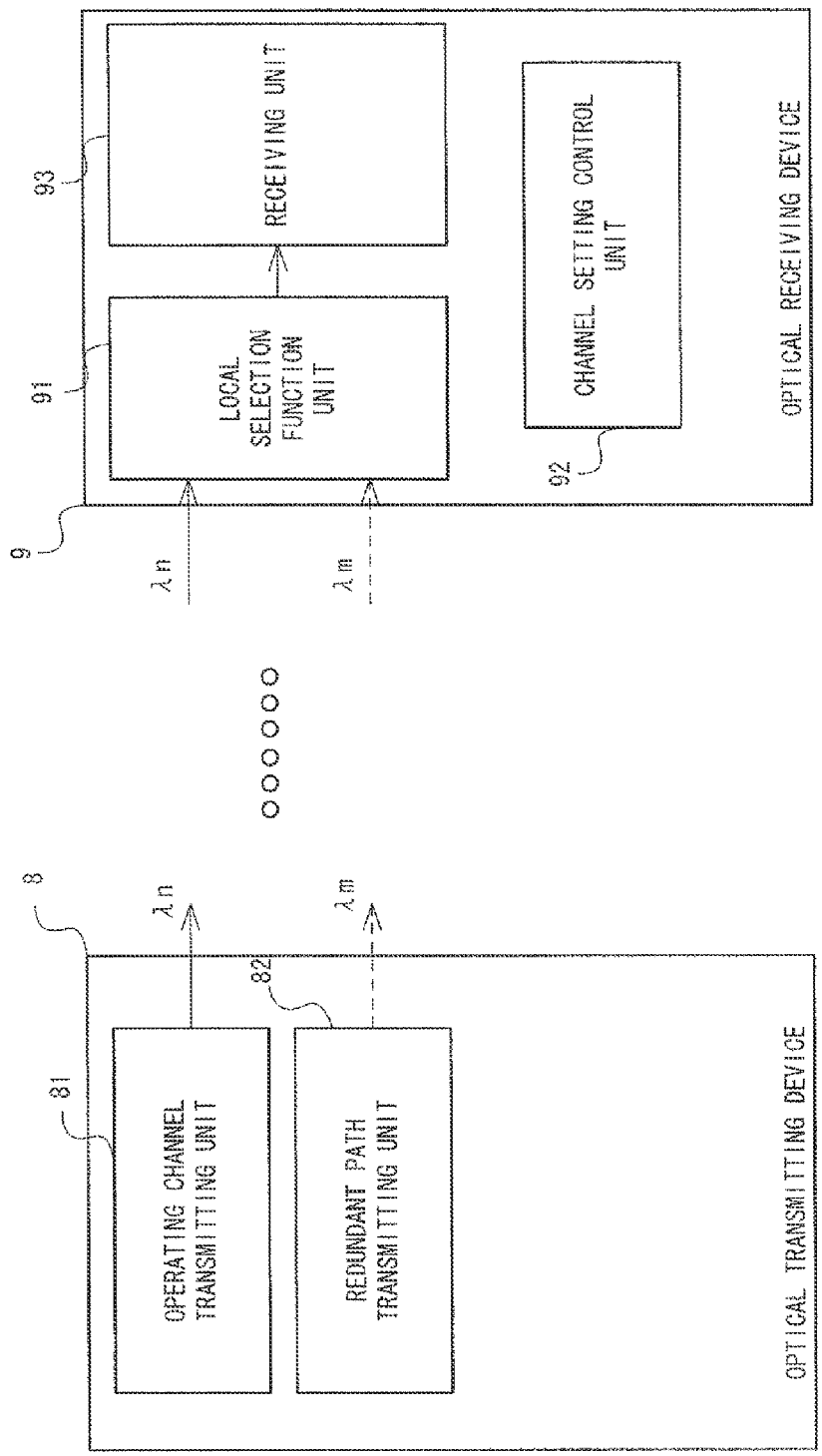
FIG. 6 is a block diagram of an optical transmission system as an outline of the wavelength division multiplexing transmission system according to the exemplary embodiment of the invention.

The configuration of an optical transmission system that serves as the outline of the wavelength division multiplexing transmission system according to the exemplary embodiment of the invention is described hereinafter with reference to FIG. 6. FIG. 6 is a block diagram of an optical transmission system as the outline of the wavelength division multiplexing transmission system according to the exemplary embodiment of the invention. The wavelength division multiplexing transmission system according to the above-described exemplary embodiment may be regarded as the optical transmission system shown in FIG. 6 as its outline configuration.

The optical transmission system includes an optical transmitting device 8 and an optical receiving device 9. The optical transmitting device 8 includes an operating channel transmitting unit 81 and a redundant channel transmitting unit 82. The optical receiving device 9 includes a local selection function unit 91, a channel setting control unit 92, and a receiving unit 93. Note that the optical transmitting device 8 corresponds to the Tx transponder 1, and the optical receiving device 9 corresponds to the Rx transponder 4.

The operating channel transmitting unit 81 transmits a first optical signal to an operating channel. Note that the operating channel transmitting unit 81 corresponds to the operating path transmitting unit 11.

The redundant channel transmitting unit 82 transmits a second optical signal having the same information as and a different wavelength from the first optical signal to a redundant channel. Note that the redundant channel transmitting unit 82 corresponds to the redundant path transmitting unit 12.

The local selection function unit 91 has a function of selecting the first optical signal or the second optical signal by interference of local light having the same wavelength as the first optical signal or the second optical signal transmitted from the optical transmitting device 8. Note that the local selection function unit 91 corresponds to the local selection function unit 41.

The channel setting control unit 92 sets the wavelength to be selected by the local selection function unit 91. Note that the channel setting control unit 92 corresponds to the path setting control circuit 43.

The receiving unit 93 receives the first optical signal or the second optical signal selected by the local selection function unit 91. Note that the receiving unit 93 corresponds to the received signal processing unit 42.

According to the configuration of the optical transmission system described above, when an abnormal condition occurs in the operating channel, the operation can continue only by setting the wavelength of the second optical signal that is transmitted through the redundant channel as the wavelength to be selected in the channel setting control unit 92. In other words, the operation in the redundant configuration where the path is made redundant can be implemented only by the setting of the wavelength in the optical receiving device 9. Accordingly, in a system to transmit optical signals, it is possible to simplify the system and reduce the cost even when the redundant configuration is constructed.

An exemplary advantage according to the above-described exemplary embodiments is to be able to simplify the system and reduce the cost even when the redundant configuration is constructed in the system to transmit optical signals.

It should be noted that the present invention is not restricted to the above-described exemplary embodiment, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical transmission system comprising:
   an optical transmitting device; and
   an optical receiving device, wherein
   the optical transmitting device includes:
      an operating channel transmitting unit that transmits a first optical signal to an operating channel; and
      a redundant channel transmitting unit that transmits a second optical signal having the same information as and a different wavelength from the first optical signal to a redundant channel, and
   the optical receiving device includes:
      a local selection function unit that has a function of selecting a wavelength of the first optical signal or the second optical signal by interference of local light having the same wavelength as the first optical signal or the second optical signal transmitted from the optical transmitting device;
      a channel setting control unit that sets a wavelength to be selected by the local selection function unit; and a receiving unit that receives the first optical signal or the second optical signal having the wavelength selected by the local selection function unit.

2. The optical transmission system according to claim 1, wherein the channel setting control unit monitors an abnormal condition in the operating channel and, when detecting an abnormal condition in the operating channel, sets the wavelength of the second optical signal as the wavelength to be selected by the local selection function unit.

3. The optical transmission system according to claim 1, wherein
the optical transmission system includes a plurality of optical transmitting devices and a plurality of optical receiving devices, and
each of the plurality of optical receiving devices corresponds to each of the plurality of optical transmitting devices, and receives the first optical signal or the second optical signal transmitted from the corresponding optical transmitting device.

4. The optical transmission system according to claim 3, further comprising:
an optical wavelength multiplexing unit that multiplexes wavelengths of a plurality of first optical signals transmitted from the plurality of optical transmitting devices and transmits the first optical signals to the operating channel, and multiplexes wavelengths of a plurality of second optical signals transmitted from the plurality of optical transmitting devices and transmits the second optical signals to the redundant channel; and
an optical wavelength dividing unit that divides the wavelengths of the plurality of first optical signals transmitted through the operating channel and outputs the first optical signals to each of the plurality of optical receiving devices, and divides the wavelengths of the plurality of second optical signals transmitted through the redundant channel and outputs the second optical signals to each of the plurality of optical receiving devices.

5. The optical transmission system according to claim 4, further comprising:
a storage unit that stores wavelength information indicating wavelengths of the first optical signal and the second optical signal output to each of the plurality of optical receiving devices after wavelength division, and
the local selection function unit specifies the wavelength of the first optical signal or the second optical signal based on the wavelength information stored in the storage unit.

6. The optical transmission system according to claim 4, wherein
each of the optical transmitting device and the optical receiving device is a transponder, and
each of the optical wavelength multiplexing unit and the optical wavelength dividing unit is a WSS (Wavelength Selective Switch).

7. A receiving-end device comprising:
a local selection function unit that has a function of selecting a wavelength of a first optical signal transmitted from an optical transmitting device through an operating channel or a second optical signal transmitted from the optical transmitting device through a redundant channel, the second optical signal having the same information as and a different wavelength from the first optical signal, by interference of local light having the same wavelength as the first optical signal or the second optical signal;
a channel setting control unit that sets a wavelength to be selected by the local selection function unit; and
a receiving unit that receives the first optical signal or the second optical signal having the wavelength selected by the local selection function unit.

8. An optical transmission method comprising:
transmitting a first optical signal to an operating channel and transmitting a second optical signal having the same information as and a different wavelength from the first optical signal to a redundant channel;
setting a wavelength of an optical signal to be selected between the first optical signal and the second optical signal;
selecting a wavelength of the first optical signal or the second optical signal transmitted by interference of local light having the set wavelength; and
receiving the first optical signal or the second optical signal having the selected wavelength.

* * * * *